United States Patent

[11] 3,623,970

[72] Inventor Georg Haas
Wilheln Strasse 24, Bad Durrheim, Germany
[21] Appl. No. 794,853
[22] Filed Jan. 29, 1969
[45] Patented Nov. 30, 1971
[32] Priority Jan. 30, 1968
[33] Germany
[31] P 12 78 956.9

[54] COMPACT OZONIZER FOR WATER LINES
2 Claims, 2 Drawing Figs.

[52] U.S. Cl. ................................................. 204/314,
204/129, 204/263, 204/264, 204/265, 204/266
[51] Int. Cl. ....................................................... C01b 13/12,
C01b 13/04, C22d 1/02
[50] Field of Search .......................................... 204/176,
313–322, 129, 263, 264–266

[56] References Cited
UNITED STATES PATENTS

| 1,398,658 | 11/1921 | Vincent | 204/129 |
| 1,581,944 | 4/1926 | Hausmeister | 204/129 |
| 2,857,323 | 10/1958 | Cromwell | 204/314 X |
| 3,346,470 | 10/1967 | Henes | 204/129 |

Primary Examiner—John H. Mack
Assistant Examiner—Neil A. Kaplan
Attorney—Franklin R. Jenkins ABSTRACT: A unitary combination of an electrolyte cell and converter for liberated oxygen to ozone, with means for proportioning ozone dosage in accordance with rate of water flow in a conduit. Anode and cathode chambers are closed off at their upper portions and electrolyte levels therein vary with pressure of gases and may differ by resulting hydrostatic head.

COMPACT OZONIZER FOR WATER LINES

Related application

Applicant is the applicant named in application Ser. No. 736,051 filed Jan. 11, 1968.

BACKGROUND OF THE INVENTION

1. Field of the Invention water treater using electrolytic oxygen converted to ozone.

2. Description of the Prior art

Municipal water supply systems usually include some kind of sterilization apparatus using chlorine gas or ozone for the improvement of water quality, and the treatment is almost always done at only a few points at most, within the system. When ozone is used it is generally supplied from pressure storage tanks.

Heretofore however, there has been, so far as I am aware, no apparatus or household appliance for adding ozone to tap water in the home or for small numbers of users, even though unpurified water has been directly piped from shallow wells and the like to the consumer. Moreover, even biologically acceptable water may frequently possess an objectionable taste or odor removable by ozone.

While there are devices for adding chemical reagents to drinking water for the liberation of chlorine, these are inconvenient for household use. Pure oxygen rather than air is much better for conversion to ozone since air gives a large proportion of nitric oxide and would induce nitrate poisoning of the user.

SUMMARY OF THE INVENTION

The above objections are greatly minimized in a household ozonizer for water wherein an electrolytic cell produces oxygen which passes to an oxygen-to-ozone converter as an essentially unitary part of the cell and from which ozone is injected into water in a pipe or conduit. Ozone is added to water at a rate proportional to waterflow. A moisture absorber in the oxygen flow passage enables use of high voltage on the converter. The upper part of the anode chamber of the cell serves as a collecting space for the oxygen while the hydrogen from the cathode is bled to the atmosphere.

DRAWING

FIG. 1 schematically shows one form of the invention, and
FIG. 2 shows a modification of the invention.

DESCRIPTION OF THE PREFERRED EMBODIMENTS

Figure 1:
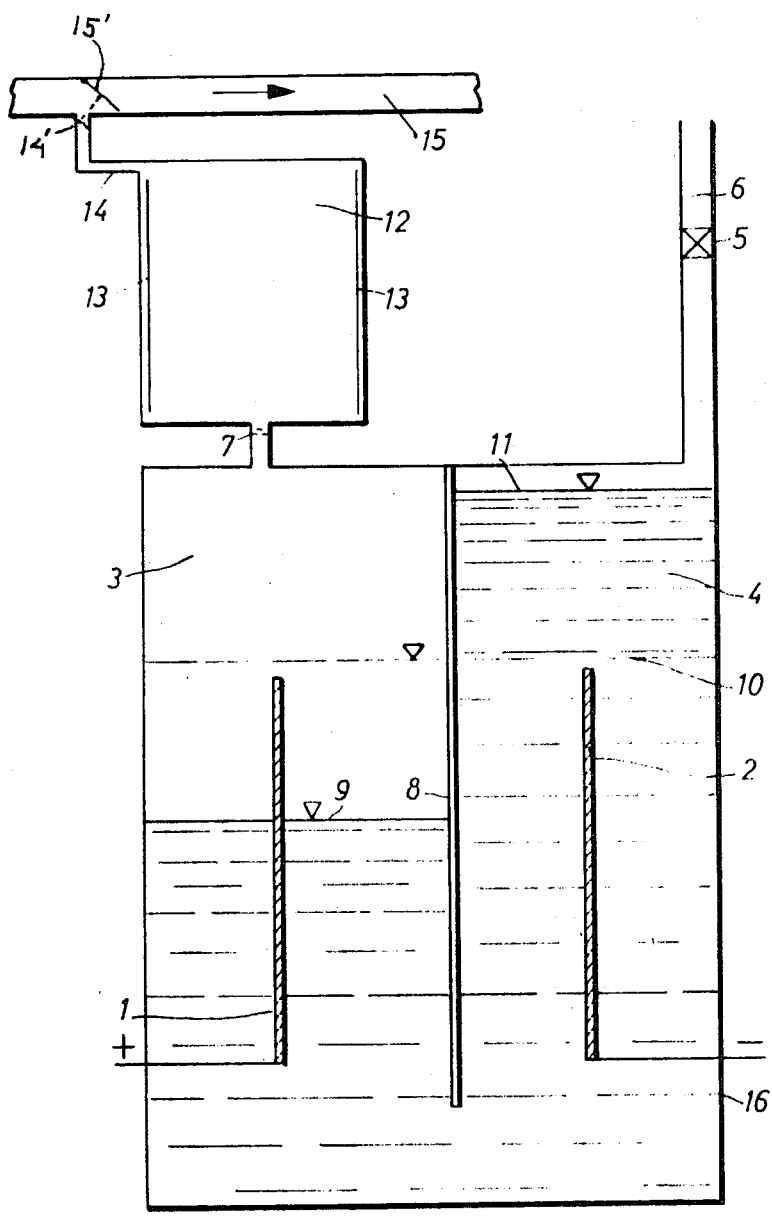

An essentially closed electrolytic cell vessel 16 is divided into anode and cathode chambers or compartments 3 and 4 for the anode 1 and the cathode 2 by means of a partitioning wall 8 extending to the top of the vessel but terminating short of the bottom thereof for liquid communication between the chambers.

At the beginning of electrolysis the electrolyte stands at the same level 10 in both chambers, but as electrolysis proceeds the oxygen collects in chamber 3 while hydrogen is allowed to escape to the atmosphere past a valve 5 and exit conduit 6. The result is that the level in the anode chamber is forced down, say, to a level 9 and the level in the cathode rises to that shown at 11. The hydrostatic head between levels 9 and 11 increases the pressure of oxygen in the upper part of the anode chamber 3. Oxygen flows past a moisture remover 7 into an oxygen-to-ozone converter 12 provided with plates 13 connected to a source of high voltage.

Assuming sufficient gas pressure in the converter 12, ozone, and oxygen, may be made to flow through conduit 14 from the converter 12 into a waterline 15 at a rate dependent on waterflow in the line. A schematic means for accomplishing this is illustrated by ganged swinging check valves 14' and 15' in the conduit 14 and waterline 15. More refined means for accomplishing this purpose will be obvious to those skilled in the art.

In conventional manner, as by a mixing valve, the ozone is dosed into the water pipe 15.

The valve 5 in hydrogen vent pipe 6 may be a relief valve to open at a predetermined pressure, and in such a construction the pressure in the oxygen chamber 3 will be equal to such hydrogen pressure plus the hydrostatic head due to difference in electrolyte levels 9 and 11. Obviously the pressure in the ozone generator 12 will be under about the same pressure as the oxygen in chamber 3.

Figure 2:
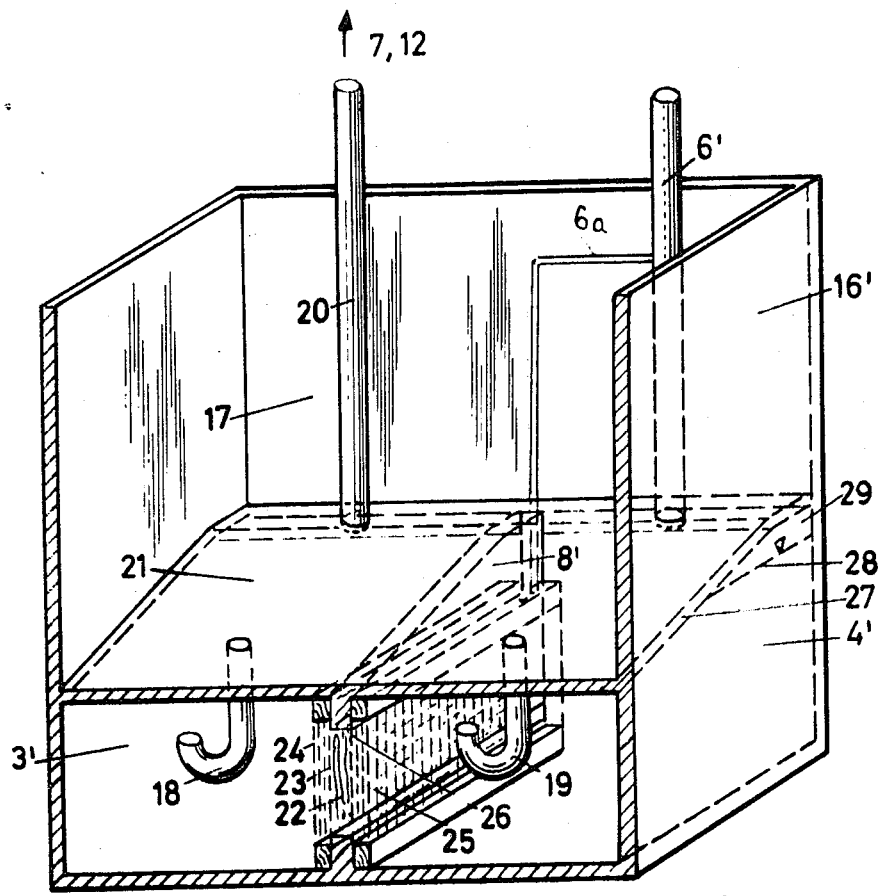

In another form of the invention as shown in FIG. 2 the cell vessel 16' is divided by a partition wall 8' into anode and cathode chambers 3' and 4' which may be provided with electrodes as in FIG. 1. During electrolysis of water in these chambers very small gas bubbles are formed adjacent the electrodes. These gas bubbles are in suspension in the water and become broken up only very slowly so that their gas may pass into the continuous gas phase above the level of the electrolyte.

If the water or electrolyte is to be passed from one chamber to the other as in FIG. 1, during gas pressure changes, the fine bubbles of hydrogen and oxygen will be entrained with the electrolyte. This danger occurs especially when oxygen is suddenly drawn off from the upper portion of the anode chamber, with the attendant sweeping of hydrogen bubbles into the anode chamber by the inward flow of electrolyte. This carrying of hydrogen bubbles into the anode chamber is minimized in the construction in FIG. 2 by providing the partitioning wall 8' with a passageway opening 22 which is covered over with close-meshed screening of spun glass gauze. The screening may be provided with spacing frames as shown and it is preferable to use at least two screens 23 and 26 disposed against opposite faces of the partitioning wall 8'. The hydrogen bubbles do not pass through the screen 26 on the cathode side of the wall, neither do the oxygen bubbles pass through the screen 23 on the anode side.

Additionally, the framings of the screen may each carry another layer of gauze respectively shown as 24 and 25 spaced outer from the respective layers 23 and 26. This form for the screening is especially advantageous if the electrodes used are plates parallel with the wall and are located near the opening and the electrodes close to each other. Closeness of the electrodes to each other is desirable in order that the power necessary for the electrolysis be as low as possible.

Turbulence of the electrolyte, near the electrodes, where the bubbles are formed, can also tend to carry the bubbles over from one chamber to the other. Should a hydrogen bubble penetrate the screen 25 it will most likely be stopped by screen 26 if it is large enough to be harmful and such stopped bubbles will, in time, agglomerate sufficiently between the screens 25 and 26 and the gas then pass to the hydrogen bleed pipe 6' via a small tube 6a. Similar means for handling oxygen bubbles between screens 23 and 24 may be used but are not shown.

Entrainment or carryover of gas bubbles from one chamber to the other is minimized by the shown construction so as to ensure that there is practically no danger of an explosive gas mixture.

The electrode chambers 3' and 4' are in the lower portion of the cell vessel 16' and are separated from the upper portion 17 by a slanted transverse platform or wall 21 sloping upwardly to form atticlike gas collecting spaces 29 above the liquid level, such as at 28 in the cathode chamber 4'. Gas takeoff conduits, 6' for the cathode chamber and 20 for the anode chamber, tap the chambers at their tops for hydrogen and oxygen respectively for subsequent handling of the gases as in FIG. 1.

The portion 17 of the vessel 16 above the slanted wall 21 serves as a storage tank for the water to be electrolyzed, though it is apparent that it will contain some of the dissolved electrolyte, such as sulfuric acid or sodium hydroxide. The liquid in the tank enters the respective electrode chambers through two J-tubes 18 and 19 depending from the slanted wall 21. The tubes preferably contain glass wool or a fiber glass filter in the lower leg in order that during reverse flow of liquid through the J-tube the filter will prevent gas bubbles from being drawn downwardly to subsequently rise into the storage tank and there present a hazard.

The invention is defined in the following:

I claim:

1. A household appliance for adding ozone to water comprising a substantially closed vessel having a substantially vertical partitioning wall depending from the top thereof and provided with a liquid passageway substantially at the bottom of the vessel to divide the upper portion of the vessel into anode and cathode chambers and to provide separated gas holding spaces in the upper parts thereof, an oxygen-to-ozone converter substantially integral with the vessel and having a gas passageway between the anode gas holding portion at the top thereof and the converter and over the anode chamber as gas exit means therefrom, means for leading ozone from the converter to the water to be treated, drying means in the gas passageway for drying produced oxygen prior to entering the converter, a gas takeoff conduit for the cathode gas holding portion as gas exit means therefrom, and a relief valve in said conduit for opening when hydrogen in the cathode portion reaches a predetermined pressure, two vertical spaced-parallel filters of closely woven spun glass on opposite faces of the wall and covering said liquid passageway to minimize the transport of evolved gas bubbles from one chamber to the other by entrainment of the bubbles in the electrolyte when the electrolyte flows from one chamber to another due to change in levels of the electrolyte in the respective chambers due to relative variation in pressures of oxygen and hydrogen, a third filter in one of the electrode chambers and parallel with the said vertical filters and spaced therefrom to provide a bubble agglomerating space between said vertical filters and the third, and a tube with exit means from the agglomerating space for removal of gas from the agglomerating space.

2. An appliance as claimed in claim 1 and electrode plates near each other in the respective chambers and the filters being substantially planar, the plates and the filters being substantially parallel.

* * * * *